Oct. 22, 1935.  J. H. PAGE  2,018,567
AUTOMATIC BRAKE ADJUSTER
Filed May 8, 1934  3 Sheets-Sheet 1
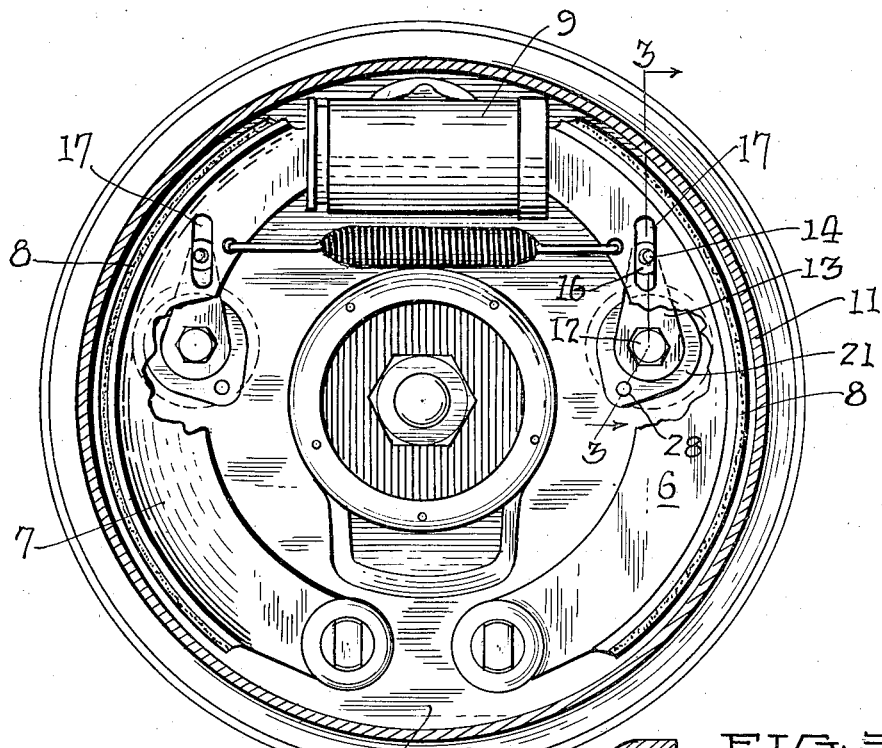
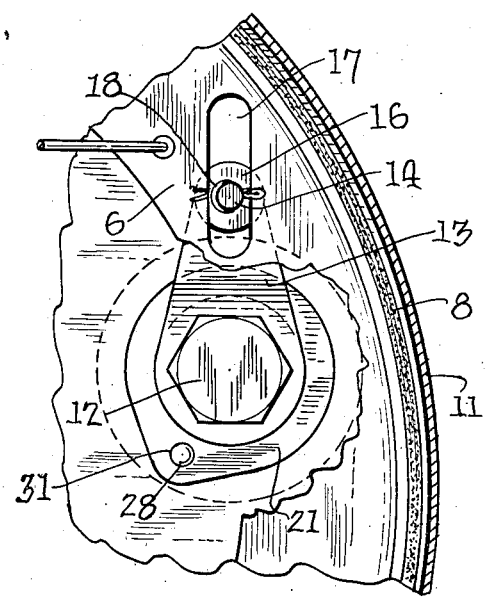
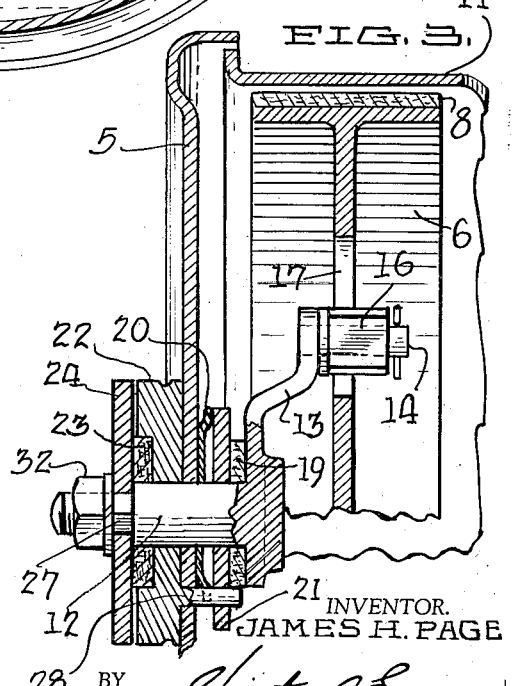
INVENTOR.
JAMES H. PAGE
BY
Victor J. Evans
ATTORNEYS.

Oct. 22, 1935. J. H. PAGE 2,018,567
AUTOMATIC BRAKE ADJUSTER
Filed May 8, 1934 3 Sheets-Sheet 2
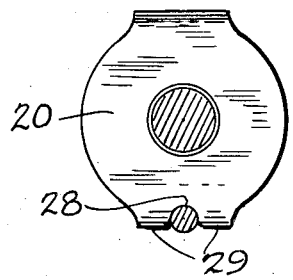
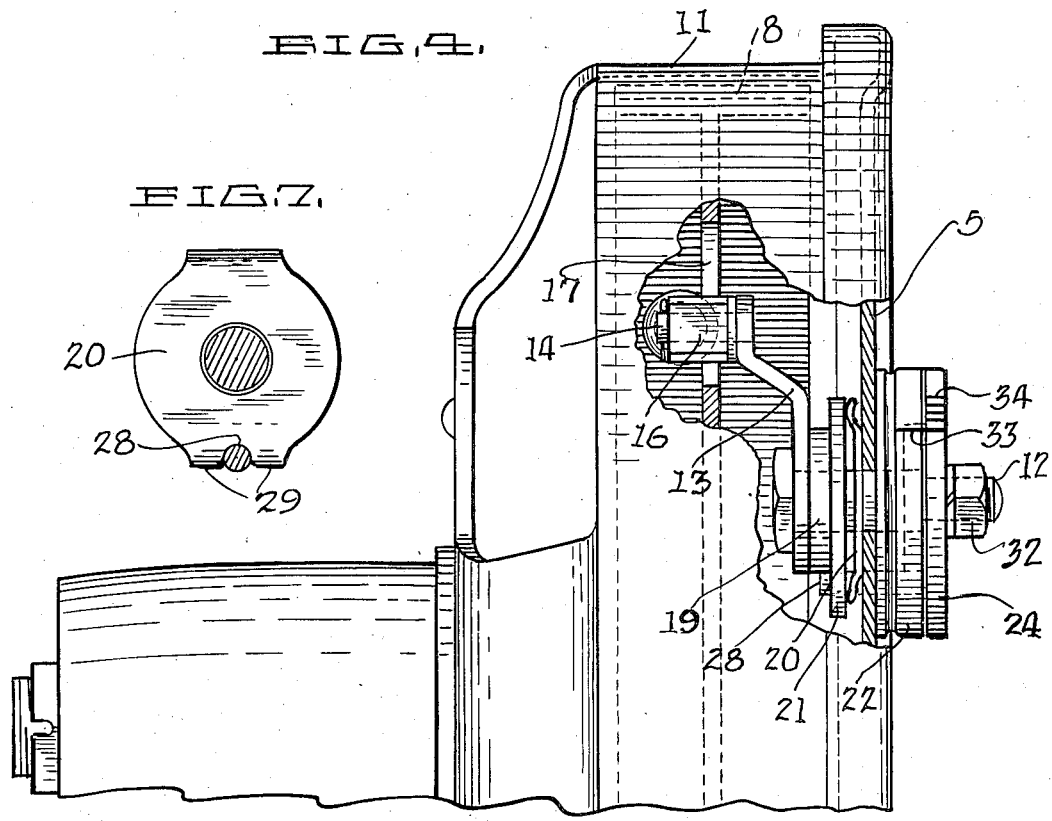
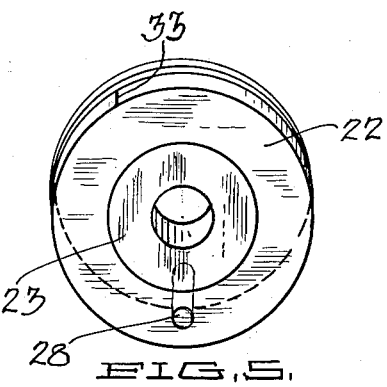
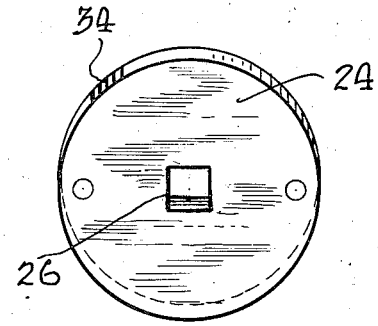
INVENTOR.
JAMES H. PAGE.
BY *Victor J. Evans*
ATTORNEY.S.

Oct. 22, 1935.  J. H. PAGE  2,018,567
AUTOMATIC BRAKE ADJUSTER
Filed May 8, 1934   3 Sheets-Sheet 3
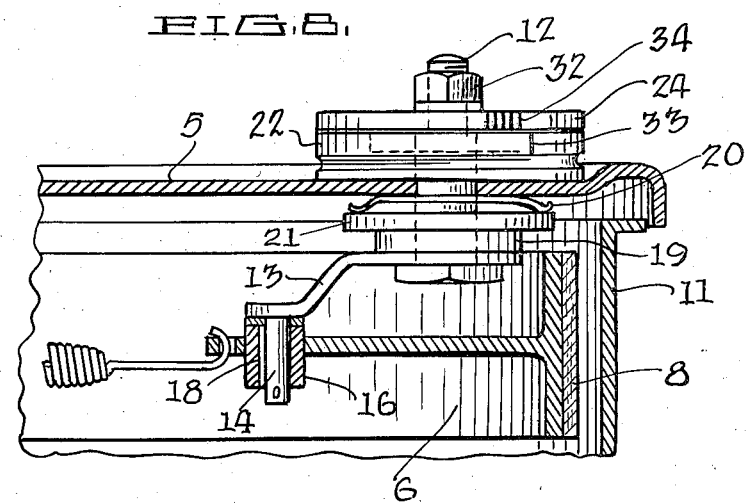
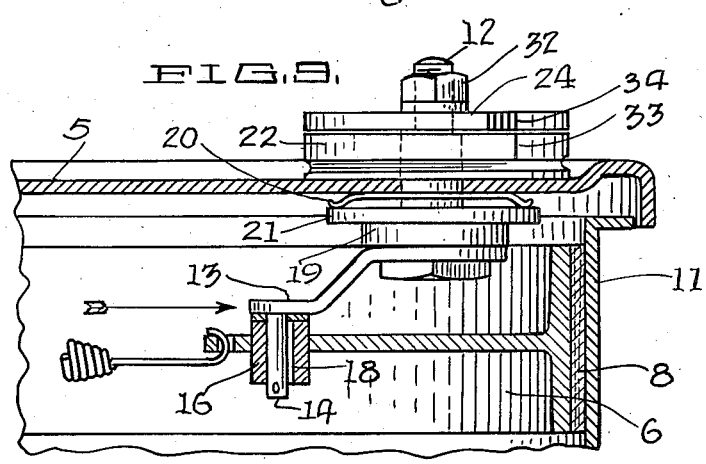
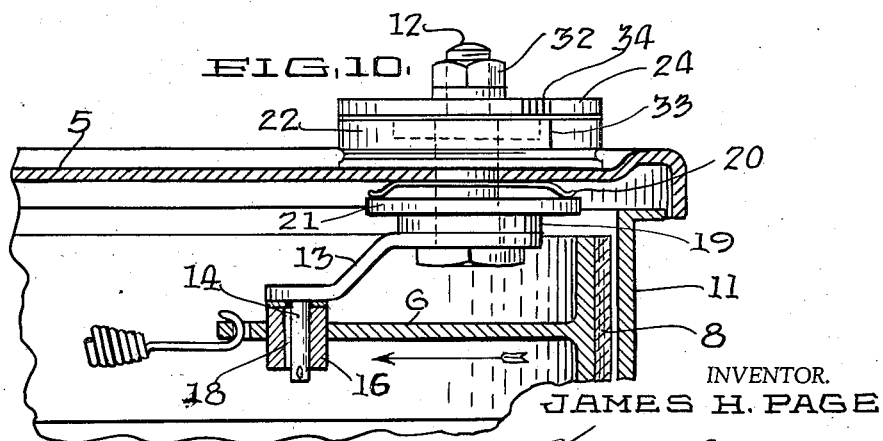
INVENTOR.
JAMES H. PAGE
BY
ATTORNEYS.

Patented Oct. 22, 1935

2,018,567

UNITED STATES PATENT OFFICE 2,018,567

AUTOMATIC BRAKE ADJUSTER

James H. Page, San Jose, Calif.

Application May 8, 1934, Serial No. 724,560

1 Claim. (Cl. 188—79.5)

This invention relates to improvements in brake equalizers and has particular reference to a means for automatically adjusting hydraulic brakes.

The principal object of the invention is to provide means whereby the space between the brake shoes and the brake drum may be automatically maintained at a pre-determined adjustment irrespective of the amount of wear of the brake lining.

A further object is to provide means whereby a person may readily observe the amount of brake lining which has been worn away without disassembling the brake mechanism.

Another object is to produce a device which is mechanically fool-proof in that an unskilled person cannot set an incorrect brake adjustment.

An additional object is to produce a device which is simple in construction and economical to manufacture, and one which may be applied to the standard motor vehicle without materially altering its construction.

A still further object is to produce a device which will enable the employment of a soft pedal action with hydraulic brakes.

Other objects and advantages will be apparent during the course of the following description.

In the accompanying drawings forming a part of this specification and in which like numerals are employed to designate like parts throughout the same, Fig. 1 is a side elevation of a hydraulic brake mechanism having my invention applied thereto, Fig. 2 is an enlarged fragmentary detail view showing the brake shoe in off-position, Fig. 3 is an enlarged fragmentary detail view on the line 3—3 of Fig. 1, Fig. 4 is an enlarged side elevation of the brake drum, partly broken away to show the interior mechanism thereof, Fig. 5 is a perspective view of the friction disc, Fig. 6 is a perspective view of the friction plate, Fig. 7 is a side elevation of the tension spring, Fig. 8 is an enlarged cross sectional view showing the initial assembly position of a brake band with relation to its brake drum, and with my device installed, Fig. 9 is a view similar to Fig. 8 showing the brake band moved against the brake drum through pressure directed in the direction of the arrow, and Fig. 10 is a similar view showing the brake in off-position after automatic adjustment has taken place.

In order that brakes may operate efficiently it is essential that a relatively small clearance be maintained between the brake lining and the brake drum. This is usually accomplished through the employment of cam members extending through the brake supporting plate, and as all of the mechanism is entirely enclosed, it will be apparent that the only medium of adjusting these cams is to tighten the cam until the brake band contacts the drum and then to release the cam a distance calculated to be correct. This type of adjustment is entirely guess work and depends upon the nature of the mechanic, and the skill with which he can adjust brakes depends largely upon their proper function. In hydraulic brakes, due to the limited piston action, a considerable throw of the piston will result in the brake pedal contacting the floor boards, thus stopping further action of the braking mechanism. Through applicant's arrangement, the amount of movement of the brakes, irrespective of the amount that the brake lining has been worn, remains constant. Consequently a better brake action and a softer brake action is possible at the foot pedal.

Applicant has devised an automatic means in the nature of a friction clutch which is assembled and connected to the brake mechanism without regard for the adjustment of the brake relative to the brake drum. Then through a lost motion connection between the brake shoe and the clutch mechanism, applicant has provided means whereby the brake may be brought into contact with the brake drum upon the pressure of the brake pedal, which pressure is also sufficient to move the clutch mechanism if need be. As soon as the pressure on the brake pedal is removed, the customary springs in the brake mechanism will pull the brake shoes away from the brake drum, but only that distance represented by the lost motion mechanism above referred to. Consequently as the next application occurs, the brake shoe has only to move through a distance equal to the lost motion, in order to be applied against the brake drum. It is apparent that as the brake lining wears away, the clutch mechanism being weaker than the pedal mechanism will move a sufficient distance to always accommodate for the wear of the brake band. In the clutch mechanism, as there is an anchored part and a movable part, it is possible to place indicia on the two parts so that this indicia may be read as the two parts slide upon each other, which indicia will indicate the amount that the brake lining has worn away and consequently the amount of serviceable lining left.

In the accompanying drawings wherein for the purpose of illustration is shown a preferred embodiment of my invention, and referring particularly to Fig. 1, it will be noted that the numeral 5 designates the brake supporting plate to which is pivoted brake shoes 6 and 7, each of which carries a brake lining 8. These shoes are in turn connected at their upper ends to brake pistons mounted within the cylinder 9 and capable of travelling in opposite directions so as to move the brake lining 8 against the brake drum 11. The mechanism thus far described is common to all standard forms of brakes and forms no part of my invention.

My invention consists of an automatic adjustment mechanism, the action of which is best illustrated in Figs. 8, 9 and 10. By referring to Fig. 8 it will be noted that the brake supporting plate 5 has a bolt 12 extending therethrough. This bolt has an arm 13 rigidly connected to the inner end of the bolt and from this arm a pin 14 extends. This pin projects into a sliding bushing 16 slidable in a slot 17 formed in the web of the brake shoe 6. It is to be here noted that the pin 14 is of less diameter than the hole 18 in the sliding bushing, this difference representing the lost motion of my device or in other words the distance between the off-position and the on-position of the brake.

Referring now to Fig. 3 it will be noted that the bolt 12 has a fibre disc 19 positioned thereon, against which a pressure plate 21 bears. A spring plate 20 is interposed between the brake supporting plate 5 and the pressure plate 21. On the outside of the brake supporting plate 5 and slidably held upon the bolt 12 is a friction disc 22 within which is recessed a fibre friction disc 23 which in turn contacts a friction plate 24 having a squared opening 26 and adapted to fit upon the squared end 27 of the bolt 12. A pin 28 carried by the friction disc 22 extends through the plate 5 between the bifurcated ends 29 of the tension spring 20 and into an opening 31 formed in the pressure plate 21. It is obvious that the nut 32 is employed to tighten all of the parts assembled upon the bolt so that proper frictional engagement will be caused.

By viewing Figs. 5 and 6 it will be noted that on the periphery of the friction disc there is a single indicia mark 33 and on the friction plate 24 there is a plurality of indicia marks 34. The purpose of these will be apparent by viewing Fig. 4, where it will be noted that these marks line up, and by observing them from time to time it will be possible to note as the arm 13 moves upon the axis of the bolt 12 for as the arm moves due to the wear of the brake lining, the disc 22 will remain stationary but the plate 24 will move with the arm through its squared connection to the bolt 12. This will move the indicia means on the plate 24 progressively forward so that when the last line is reached it will be apparent that the lining has been entirely used up and consequently must be replaced.

It is apparent by viewing Fig. 1 that a clutch mechanism together with the lost motion mechanism is included in each brake shoe so that both brake shoes are automatically adjusted at all times.

Briefly, what I have devised is a mechanism which permits the brake shoe to move toward the brake drum any desired distance, but prevents retrograde movement further than a predetermined distance.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In combination with a brake mechanism including a brake supporting plate and a pair of brake shoes pivotally mounted on said plate, and a brake drum capable of being contacted by said brake shoes, of an arm supporting the free ends of each of said brake shoes, said arm having a bolt formed integral therewith and extending through said plate, friction means mounted on said bolt and held against rotation with respect to said plate, a friction plate keyed to said bolt and engaging said friction means on one side of said plate, graduations formed on said plate and said adjacent friction means, whereby movement of said plate with relation to said friction means may be observed, a slot formed in each of said brake shoes, a lost motion roller carried by said arm and engaging the slot in one of said shoes, whereby limited movement of the shoe with respect to the arm may take place.

JAMES H. PAGE.